United States Patent
Ching

(10) Patent No.: US 7,450,356 B2
(45) Date of Patent: Nov. 11, 2008

(54) ROTATION SPEED CONTROLLER FOR FANS

(75) Inventor: Chan Ching, Taipei Hsien (TW)

(73) Assignee: Perfect Union Co., Ltd., Taipei Hsien (TW)

( * ) Notice: Subject to any disclaimer, the term of this patent is extended or adjusted under 35 U.S.C. 154(b) by 209 days.

(21) Appl. No.: 11/544,033

(22) Filed: Oct. 6, 2006

(65) Prior Publication Data

US 2008/0084640 A1   Apr. 10, 2008

(51) Int. Cl.
*H02H 7/09*   (2006.01)
(52) U.S. Cl. ............... 361/33; 361/23; 361/25; 318/432; 392/370; 392/372; 392/364; 392/436
(58) Field of Classification Search ............ 318/432; 361/23, 25, 33; 392/370, 372, 364, 436
See application file for complete search history.

(56) References Cited

U.S. PATENT DOCUMENTS

| | | | | |
|---|---|---|---|---|
| 4,642,441 | A * | 2/1987 | Kenyon | 392/365 |
| 6,204,623 | B1 * | 3/2001 | Levy et al. | 318/641 |
| 2007/0046107 | A1 * | 3/2007 | Jayaram et al. | 307/117 |
| 2007/0077042 | A1 * | 4/2007 | Jayaram et al. | 392/385 |

* cited by examiner

*Primary Examiner*—Rita Leykin
(74) *Attorney, Agent, or Firm*—Troxell Law Office, PLLC

(57) ABSTRACT

A specially designed rotation speed controller for fans, in addition to basic components like variable resistor, the controller has also been equipped with special components such as TRIAC, micro limit switch, and glass tube fuse, which allows said controller to precisely control the on/off status and the rotation speed of the fan, and the controller also provides power-off protection against power overload.

1 Claim, 4 Drawing Sheets

ROTATION SPEED CONTROLLER FOR FANS

CROSS-REFERENCES TO RELATED APPLICATIONS

Not Applicable

STATEMENT REGARDING FEDERALLY SPONSORED RESEARCH OR DEVELOPMENT

Not Applicable

BACKGROUND OF THE INVENTION

In order to facilitate the flow of air and adjust room temperature in a most economic and effective way, the inner spaces of general buildings are usually fitted with oscillating fans, which are either suspended from the ceiling or fixed on the walls.

In older suspended fans and fixed fans, the main features on their control panel are concerned with controlling the on/off status of the fans. Although the feature of speed controller has been added later on, such features are mainly concerned with the control of rotation speed of fans, and most of the control switches lack any protection against power overload. A good example can be found in U.S. Pat. No. 4,724,286.

SUMMARY OF THE INVENTION

This invention proposes a rotation speed controller for fans, and more particularly, it is related to a controller that can effectively control the on/off functions and rotation speed of ceiling suspended fans and wall-fixed fans. The main feature of the controller is that in addition to basic components like variable resistor, the controller has also been equipped with special components such as TRIAC, micro limit switch, and glass tube fuse, which allows said controller to precisely control the on/off status and the rotation speed of fans, and the controller also offers power-off protection against power overload.

DETAILED DESCRIPTION OF SOME EMBODIMENTS

To overcome the disadvantages of the rotation speed controller in the traditional suspended fans and fixed fans mentioned previously, the inventor has undertaken extensive research and trials, and eventually developed a rotation speed controller for fans as disclosed in this patent. The controller structure is comprised of: a heat-dissipation plate, a housing body, and the room between them also includes components like a rotary knob, a variable resistor, a trimmer potentiometer, a capacitor, a print circuit board, an inductance toroid, a micro limit switch, a TRIAC, and a glass tube fuse.

After the components described above are assembled, a rotation speed controller for fans is produced, its main features are that in addition to basic components like variable resistor, the controller also includes other components such as the TRIAC, the micro limit switch, and the glass tube fuse; thereby allowing the controller to exercise precise control over the on/off status and the rotation speed adjustment, and it also provides power-off protection against power overload.

The rotation speed controller for fans of the invention can be used in fans that employ different electrical currents; there are mainly three different models for use in fans with different electrical currents, ranging from 3 A, 8 A, to 12 A. It should be noted that these models only differ from each other in their specification of heat-dissipation plates and fuses, their basic structures are identical.

Figure 1:
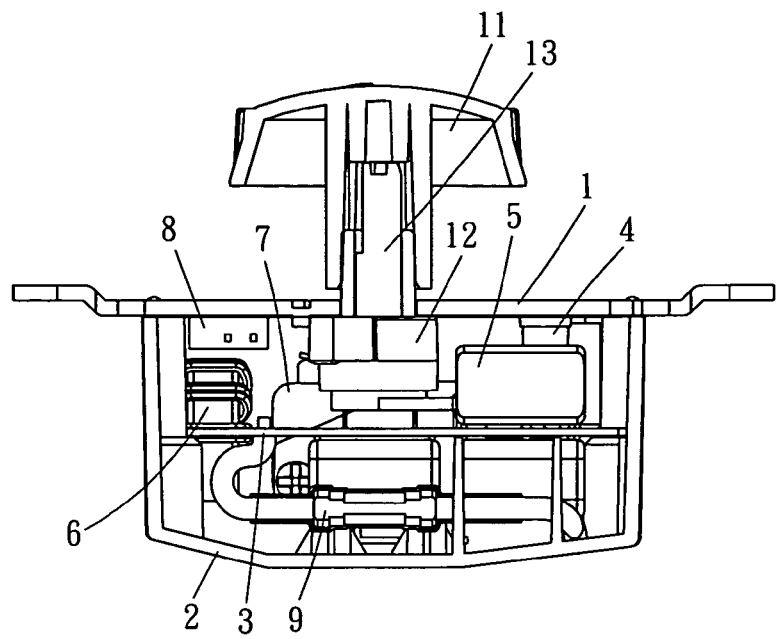
FIG. 1 is a sectional view showing a speed controller of fans for use with a current of 3 A, according to this invention.
Figure 3:
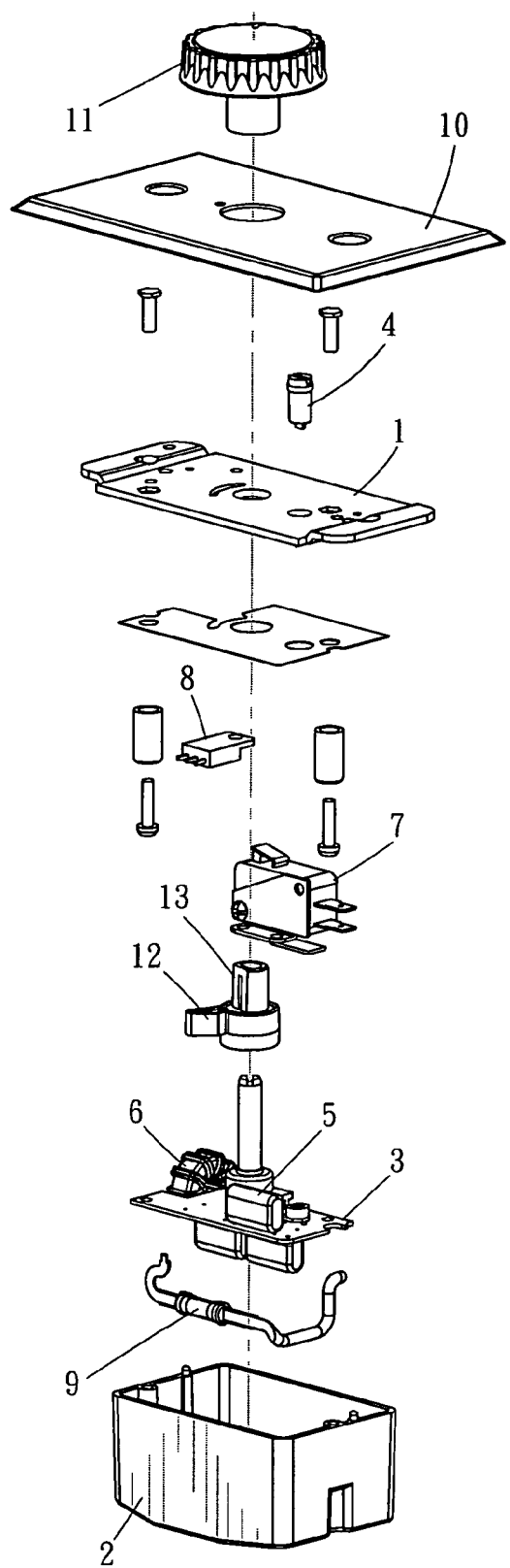
FIG. 3 is a three-dimensional exploded view illustrating a speed controller of fans for use with a current of 3 A, according to this invention.

As indicated in FIG. 1 and FIG. 3, in a rotation speed controller for fans of the invention for use with an electrical current of 3 A, a printed circuit board 3 is disposed between heat-dissipation plate 1 and housing body 2, on the printed circuit board 3 is disposed with a trimmer potentiometer 4, a capacitor 5, an inductance toroid 6, a micro limit switch 7, a TRIAC 8, and a glass tube fuse 9; a cover board 10 is also added on top of the heat-dissipation plate 1.

A rotary knob 11 is disposed on the heat-dissipation plate 1, and a cam 12 is attached to one end of the main bearing of said rotary knob 11, the rotation area of the cam 12 is next to the micro limit switch 7 mentioned above, thus allowing a suspended fan or fixed fan to be precisely turned on and off by rotating said rotary knob 11; a variable resistor 13 is attached to the main bearing of said rotary knob 11 for controlling the rotation speed of a suspended fan or a fixed fan without differentiation in rotation speed, after said rotary knob 11 is turned on.

Figure 2:
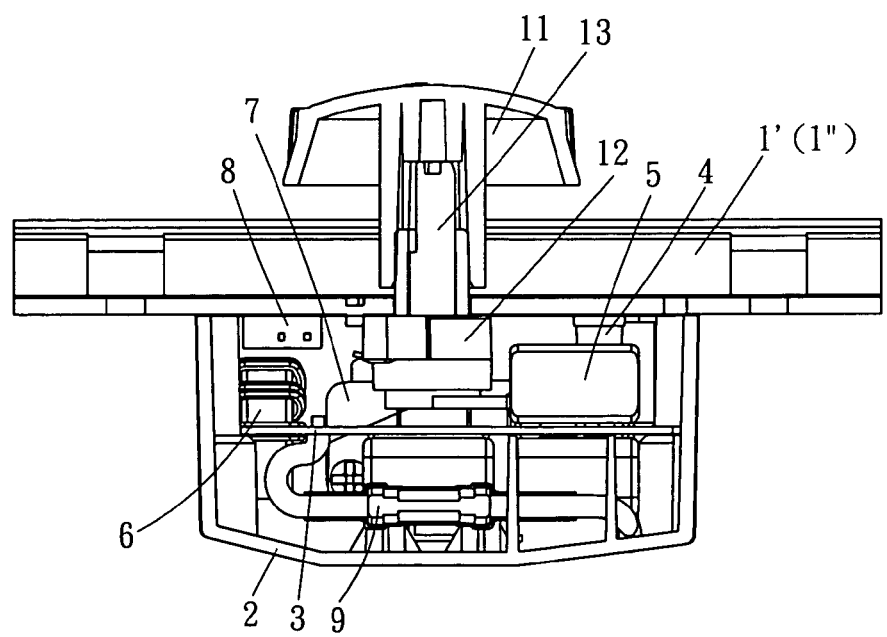
FIG. 2 is a sectional view showing a speed controller of fans for use with a current of 8 A and 12 A, according to this invention.
Figure 4:
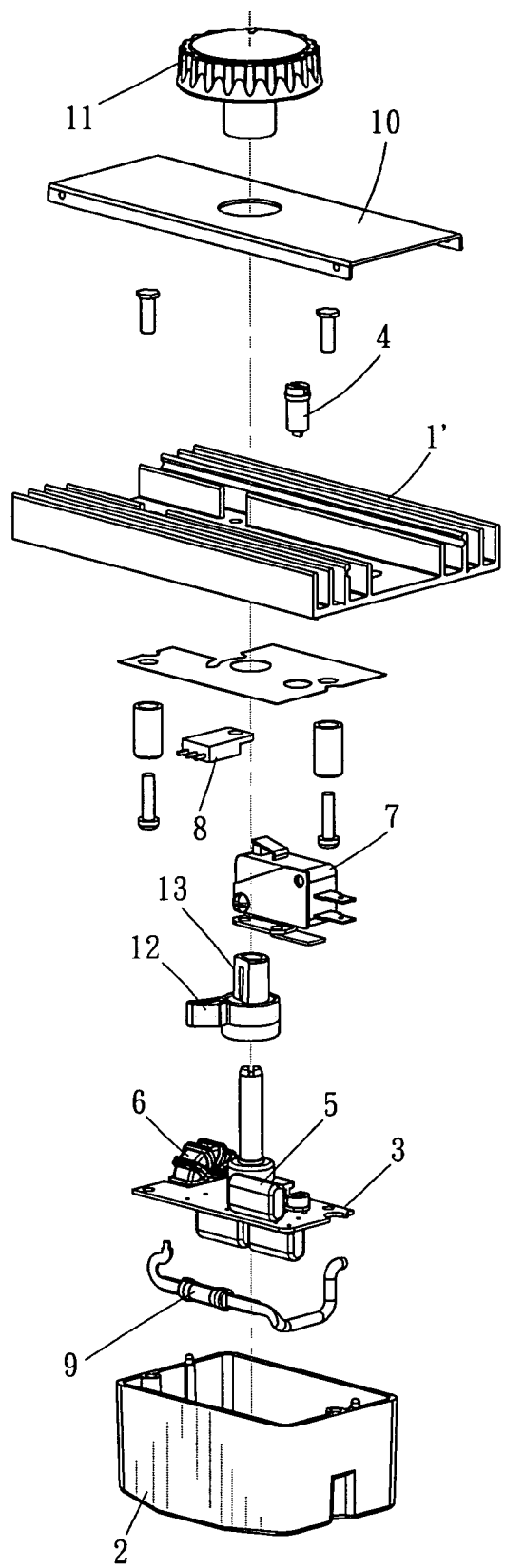
FIG. 4 is a three-dimensional exploded view illustrating a speed controller of fans for use with a current of 8 A, according to this invention.
Figure 5:
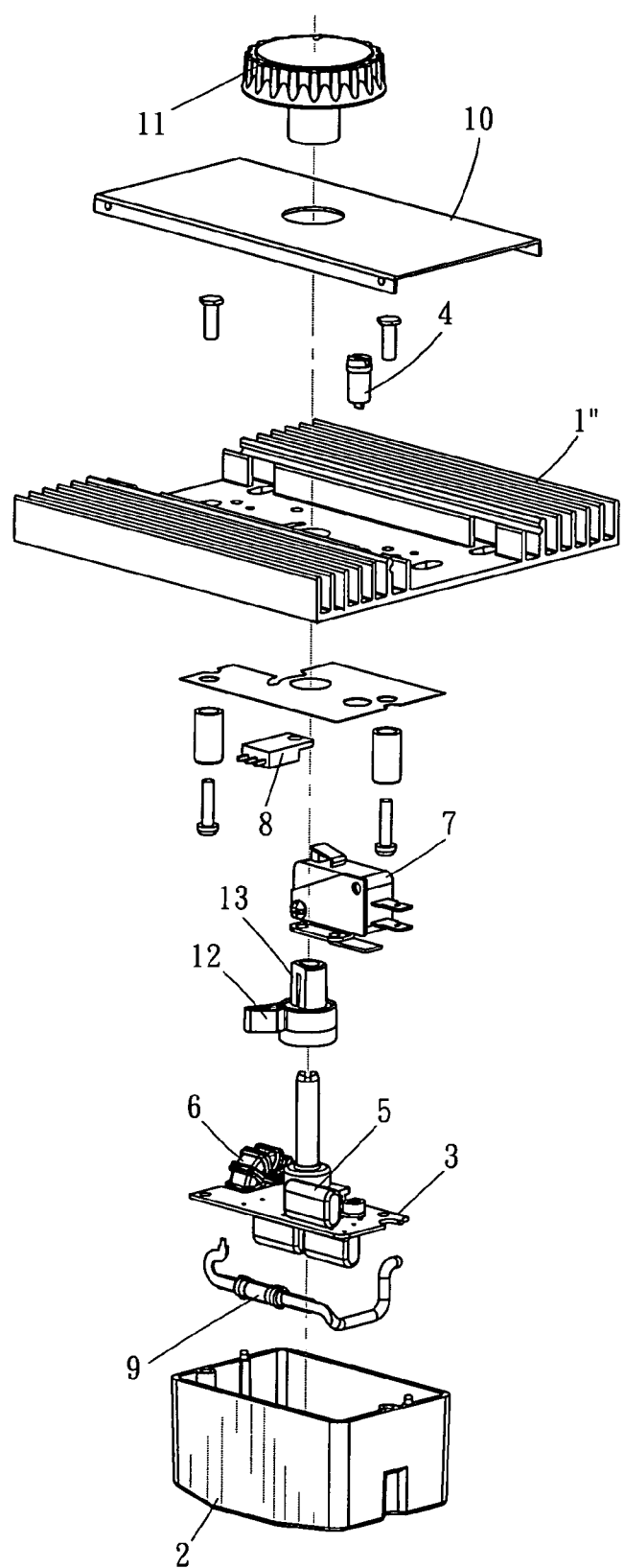
FIG. 5 is a three-dimensional exploded view illustrating a speed controller of fans for use with a current of 12 A, according to this invention.

FIG. 2, FIG. 4, and FIG. 5 show that the rotation speed controller of the invention can be slightly altered in structure in response to different volume of electrical currents. For example, in the controllers for use with 8 A and 12 A electrical currents, the original heat-dissipation plate 1 can be replaced by heat-dissipation plate 1' and 1", both of which dissipate heat more effectively than that of heat-dissipation plate 1; the rest of the structure is identical in all models, but the design of certain components differs in response to different volume of electrical currents.

The main feature of the rotation speed controller of the invention is that the circuit board has also been installed with a TRIAC 8 and a micro limit switch 7 to allow for more precise control over the on/off status and the rotation speed; additionally, a glass tube fuse 9 has also been installed to provide the controller with power-off protection against power overload, thereby ensuring safety during the usage of the fan.

What is claimed is:

1. A rotation speed controller for fans, including three types of models for use in fans with the electrical current of 3 A, 8 A, or 12 A; the main difference between them being the specification of heat-dissipation plates and fuses are different from one another; the controller structure is comprised of: a printed circuit board 3 located between a heat-dissipation plate 1 and housing body 2, on said printed circuit board 3 is disposed with a trimmer potentiometer 4, a capacitor 5, an inductance toroid 6, a micro limit switch 7, a TRIAC 8, and a glass tube fuse 9; a cover board 10 added on top of said heat-dissipation plate 1, a rotary knob 11 disposed on said heat-dissipation plate 1, a cam 12 attached to one end of the main bearing of said rotary knob 11, the rotation area of said cam 12 being next to said micro limit switch 7, thus allowing a suspended fan or fixed fan to be precisely turned on and off by rotating said rotary knob 11; a variable resistor 13 attached on the main bearing of said rotary knob 11 for controlling the rotation speed of a suspended fan or a fixed fan without differentiation in rotation speed, after said rotary knob 11 is turned on; the rotation speed controller for fans of the invention has the following features:

A TRIAC 8 and a micro limit switch 7 disposed on the circuit board for providing more precise control of the on/off status, and the rotation speed; a glass tube fuse 9 providing power-off protection in case power overload occurs in said controller to ensure safety.

\* \* \* \* \*